US008736841B1

(12) United States Patent
Xu et al.

(10) Patent No.: US 8,736,841 B1
(45) Date of Patent: May 27, 2014

(54) METHOD AND APPARATUS FOR ALIGNING AND VALIDATING THE MEASUREMENTS OF COLOR MEASUREMENT INSTRUMENTS

(71) Applicant: Datacolor Holding AG, Lucerne (CH)

(72) Inventors: Zhiling Xu, West Windsor, NJ (US); Michael H. Brill, Kingston, NJ (US); Taeyoung Park, West Windsor, NJ (US)

(73) Assignee: Datacolor Holding AG, Lucerne (CH)

( * ) Notice: Subject to any disclaimer, the term of this patent is extended or adjusted under 35 U.S.C. 154(b) by 0 days.

(21) Appl. No.: 13/779,041

(22) Filed: Feb. 27, 2013

(51) Int. Cl.
*G01J 3/46* (2006.01)

(52) U.S. Cl.
CPC ...................................... *G01J 3/462* (2013.01)
USPC ....................................................... 356/402

(58) Field of Classification Search
CPC ............... G01J 3/36; G01J 3/462; G01J 3/52; G01J 3/524
USPC .......... 356/300–334, 402–425; 702/104, 126, 702/189; 382/162, 167, 276, 305; 345/600; 348/222.1, 223.1
See application file for complete search history.

(56) References Cited

U.S. PATENT DOCUMENTS

| | | | |
|---|---|---|---|
| 6,559,944 B1 * | 5/2003 | Van Aken et al. | 356/425 |
| 7,499,164 B2 | 3/2009 | Pawlanta | |
| 2004/0135794 A1 * | 7/2004 | Van Aken et al. | 345/600 |
| 2007/0002324 A1 | 1/2007 | Pawlanta et al. | |
| 2008/0013828 A1 * | 1/2008 | Pearson et al. | 382/167 |
| 2009/0097736 A1 | 4/2009 | Agarwal | |

OTHER PUBLICATIONS

Berns et al., "Empirical Modeling of Systematic Spectrophotometric Errors" Color Res Appl. Volume 13, No. 4, Aug. 1988. pages 243-256.
Rich et al., "Improved Model for Improving the Inter-Instrument Agreement of Spectrophotometers" Analytica Chimica Acta 380 (1999) pp. 263-276.
Ingleson et al., "Methods of Selecting a Small Reflectance Set as a Transfer Standard for Correcting Spectrophotometers" Color Res Appl. Volume 31, No. 1, Feb. 2006., pp. 13-17.
International Search Report and Written Opinion for International Patent Application Serial No. PCT/US2013/049857, mailed Dec. 5, 2013, consists of 8 unnumbered pages.

* cited by examiner

*Primary Examiner* — Gregory J Toatley
*Assistant Examiner* — Willie Merrell, II (57) ABSTRACT

Aligning measurements taken by a second color measurement instrument with measurements taken by first color measurement instrument, wherein the first instrument has access to a first set of standards but not a second set of standards, and the second instrument has access to the second set of standards but not the first set of standards, includes using a third color measurement instrument to generate a profile that mathematically transforms a value measured on the second set of standards to a value measured on the first set of standards, wherein the third instrument has access to the first and second sets of standards, mathematically transforming measurements of the second set of standards taken by the second instrument into virtual measurements of the first set of standards, using the profile, and aligning the measurements taken by the second instrument to the measurements taken by the first instrument, using the virtual measurements.

21 Claims, 6 Drawing Sheets

METHOD AND APPARATUS FOR ALIGNING AND VALIDATING THE MEASUREMENTS OF COLOR MEASUREMENT INSTRUMENTS

FIELD OF THE INVENTION

The present invention generally relates to the measurement of color, and more specifically relates to the coordination of multiple color measurement instruments.

BACKGROUND

Color-measurement instruments (e.g., spectrophotometers) can be characterized parametrically and corrected to measure like a reference or master instrument. The characterization and correction is based on instrument profiles. The "instrument profile" of a first instrument relative to a second instrument is defined herein as a set of parameter values that mathematically map a first set of reflectance values of a set of specimens as measured by the first instrument to the best approximation of a second set of reflectance values of the same specimens as measured by the second instrument. The act of "instrument profiling" is defined herein as the generation of these parameter values, and "profile-based correction" is defined herein as the act of implementing the mapping defined by these parameter values to correct subsequent reflectance measurements by the profiled instrument. Such instrument profile-based correction compensates for small systematic differences between instruments. Instrument profile-based correction typically starts from a model equation such as the following:

$$R_{ci} = A + BR_{mi} + CR'_{mi}DR''_{mi} + ER_{mi}(100 - R_{mi}) \qquad \text{(EQN. 1)}$$

Where $R_{mi}$ is the $i^{th}$ measured reflectance, Rd is the $i^{th}$ corrected reflectance, all variables A, B, C, D, and E implicitly depend on wavelength, and ' and " refer to the first and second derivatives, respectively, of $R_{mi}$ with respect to wavelength. The corrections in EQN. 1 are represented by the following parameters: offset (A), gain change (B), wavelength-scale change (C), bandwidth change (D), and some nonlinearities (E). EQN. 1 (or a similar equation, possibly with a different number of parameters) is used twice in instrument profile-based correction. The first usage of EQN. 1 measures known specimens such as the British Ceramic Research Association (BCRA) tiles with parameters A-E (at each wavelength) in the solve state. In this first usage of EQN. 1, optimizing software is typically used to find the parameter values A-E that make the computed quantities Rd closest to the quantities $R_{mi}$ of the second instrument. The now-known quantities A-E (and possibly other parameters) comprise the instrument profile of the first instrument relative to the second instrument. During the second usage of EQN. 1, the first instrument measures reflectances of test specimens, adopts the measured reflectances of the test specimens as the quantities $R_{mi}$, substitutes the now-known parameters A-E into EQN. 1, and uses EQN. 1 to compute the corrected measurements Rd. Continued operation of the second usage of EQN. 1 constitutes the instrument profile-based correction of the reflectance measurements.

Conventional instrument profile-based correction of a fleet of spectrophotometers depends on the availability of a master instrument (to act as the second instrument described above) and at least one set of trustworthy color standards (i.e., reflecting specimens such as the BCRA tiles). Such correction also works best when the master instrument is very close in design to the instruments that are being corrected to it in the fleet. In some cases, the trusted master instrument may have a slightly different design than the instruments in the fleet; however, the master instrument must still be used as an initial anchor if no better standard exists. In such a case, one can improve the inter-instrument agreement by computing the average reflectance data from the fleet of instruments and correcting the fleet of instruments to this average. However, this introduces another problem: the use of the average reflectance data requires use of the same reflecting color standards for all of the instrument measurements. This is impractical, especially when the instruments in the fleet are not geographically co-located. One must have at hand either a real master instrument or a real set of standard color tiles that is used for all corrections.

SUMMARY OF THE INVENTION

In one embodiment, aligning measurements taken by a second color measurement instrument with measurements taken by first color measurement instrument, wherein the first color measurement instrument has access to a first set of color standards but not a second set of color standards, and the second color measurement instrument has access to the second set of color standards but not to the first set of color standards, includes using a third color measurement instrument to generate a standard profile that mathematically transforms a value measured on the second set of color standards to a value measured on the first set of color standards, wherein the third color measurement instrument has access to both the first set of color standards and the second set of color standards, mathematically transforming measurements of the second set of color standards taken by the second color measurement instrument into a set of virtual measurements of the first set of color standards, using the standard profile, and aligning the measurements taken by the second color measurement instrument to the measurements taken by the first color measurement instrument, using the virtual measurements.

In another embodiment, a method for validating that measurements taken by a second color measurement instrument are aligned with measurements taken by first color measurement instrument, wherein the first color measurement instrument has access to a first set of color standards but not a second set of color standards, and the second color measurement instrument has access to the second set of color standards but not to the first set of color standards, includes aligning measurements taken by a third color measurement instrument with the measurements taken by the first color measurement instrument, using the first set of color standards, wherein the third color measurement instrument has access to both the first set of color standards and the second set of color standards, using measurements of the second set of color standards taken by the third color measurement instrument to generate a standard profile that mathematically transforms a value measured on the second set of color standards to a value measured on the first set of color standards, mathematically transforming measurements of the second set of color standards taken by the second color measurement instrument into a set of virtual measurements of the first set of color standards, using the standard profile, and comparing the virtual measurements to measurements of the first set of color standards taken by the first color measurement instrument.

Another embodiment of a method for validating that measurements taken by a second color measurement instrument are aligned with measurements taken by first color measurement instrument, wherein the first color measurement instrument has access to a first set of color standards but not a second set of color standards, and the second color measurement instrument has access to the second set of color standards but not to the first set of color standards, includes aligning measurements taken by a third color measurement instrument with the measurements taken by the first color measurement instrument, using the first set of color standards, wherein the third color measurement instrument has access to both the first set of color standards and the second set of color standards, using measurements of the second set of color standards taken by the third color measurement instrument to generate a standard profile that mathematically transforms a value measured on the second set of color standards to a value measured on the first set of color standards, modifying the measurements taken by first color measurement instrument in accordance with the standard profile to produce a virtual measurement reference, and comparing the virtual measurement reference to measurements of the second set of color standards taken by the second color measurement instrument.

BRIEF DESCRIPTION OF THE DRAWINGS

The teachings of the present invention can be readily understood by considering the following detailed description in conjunction with the accompanying drawings, in which.

DETAILED DESCRIPTION

In one embodiment, the present invention includes a method and apparatus for aligning and validating color measurements of a fleet of color measurement instruments correlated using a first set of color standards (e.g., color tiles) by profiling a second set of color standards to map to the first set of color standards. Thus, a color measurement obtained by a given color measurement instrument using the second set of color standards can be corrected to a measurement that is identical to a measurement directly obtained by the given color measurement instrument using the first set of color standards. This ensures traceability of color measurement even when the first set of color standards is lost or unavailable. Moreover, different "second" sets of color standards can be created for use in different geographic locations, thereby enabling re-correlation of the color measurement instruments at the different locations (i.e., locations without access to a common set of color standards, such as different laboratories) without the use of a master instrument. In addition, when working with fleet of color measurement instruments, a transformation from a first color measurement instrument to a second color instrument can be performed without a material transfer standard (e.g., a set of color standards that is measured by both instruments).

Within the context of the present invention, the term "standard profile" is understood to refer to a mathematical transformation of a value measured on one set of color standards to a value measured on another set of color standards. The term "instrument profile" is understood to refer to a mathematical transformation of a value measured on one color measurement instrument to a value measured on another color measurement instrument. The term "correct" is understood to refer to the actual process of mathematically transforming a value measured by one color measurement instrument to a value measured by another color measurement instrument.

In practice, a color measurement instrument measuring a set of color standards will typically generate a group of reflectance values at different wavelengths. However, when the color measurement instrument is used to measure several different sets of color standards, several different corresponding groups of reflectance values will be generated.

Figure 1:
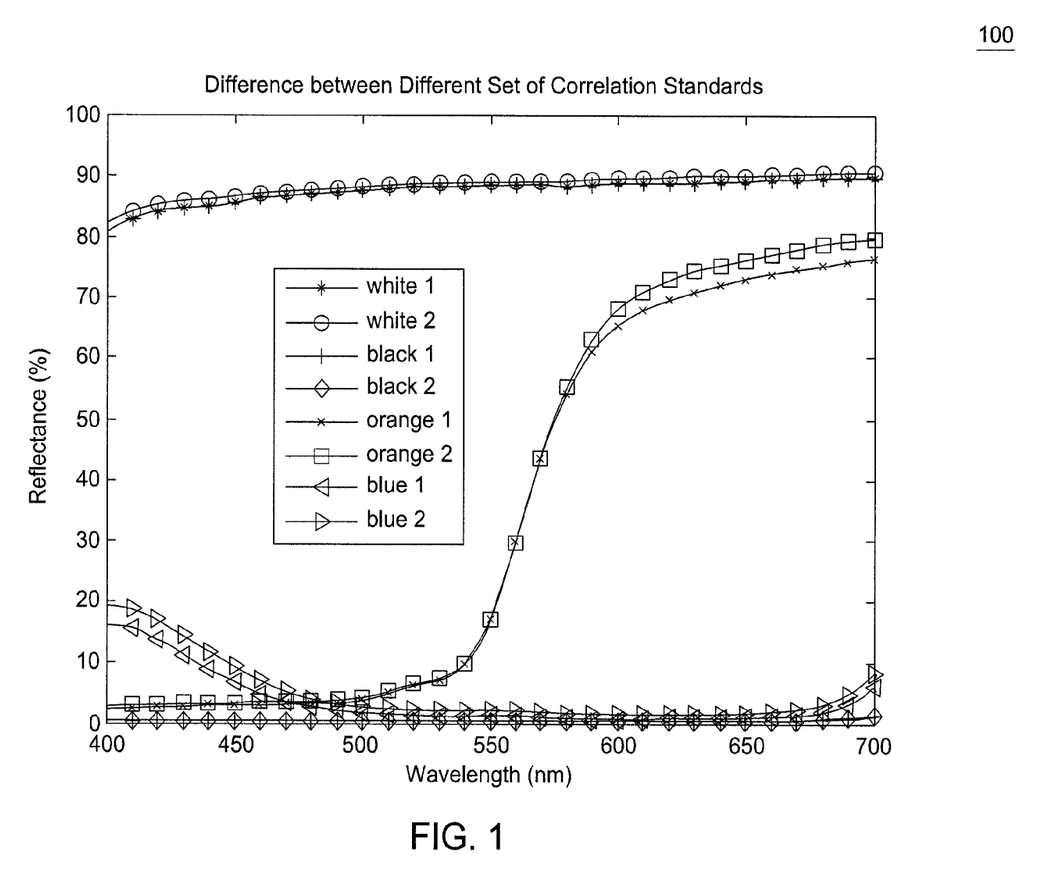
FIG. 1 is a graph illustrating the differences in measured reflectance values for two different exemplary sets of color standards.

For example, FIG. 1 is a graph illustrating the differences in measured reflectance values for two different exemplary sets of color standards. In particular, FIG. 1 plots the reflectance versus wavelength for four different tiles from each set of color standards: a white tile ("white 1" and "white 2"), a black tile ("black 1" and "black 2"), an orange tile ("orange 1" and "orange 2"), and a blue tile ("blue 1" and "blue 2"). All of the tiles were measured using the same color measurement instrument. As illustrated, although the measured reflectance values for the two sets of color standards are close, they are not identical. However, even a small difference can be problematic in industries in which accurate and consistent measurement of color is critical.

Embodiments of the present invention thus seek to profile a second set of color standards to a first set of color standards by mathematically transforming the measured reflectance value of each tile in the second set at each wavelength to the measured reflectance value of each tile in the first set at each wavelength. Thus, a color measurement obtained using the second set of color standards can be mathematically transformed to yield a value representing the measurement that would have been obtained if the first set of color standards had been used (e.g., a "virtual" measurement or reflectance value).

One possible mathematical transformation involves calculating the ratio of the measured reflectance value for a tile from the first set of color standards (e.g., "white 1" in FIG. 1) to the measured reflectance value for the corresponding tile in the second set of color standards (e.g., "white 2" in FIG. 1) at each wavelength. The measured reflectance value for the tile in the second set of color standards can then be multiplied by this ratio to obtain the reflectance value that would have been measured if the corresponding tile from the first set of color standards had been used.

Thus, assuming $R_1=[R_{11}, R_{12}, \ldots, R_{1n}]$, $R_2=[R_{21}, R_{22}, \ldots, R_{2n}]$ and $k=[k_1, k_2, k_n]$, where n is the $n^{th}$ wavelength, $R_{1n}$ is the measured reflectance value for a tile from the first set of color standards at the $n^{th}$ wavelength, $R_{2n}$ is the measured reflectance value for a corresponding tile from the second set of color standards at the $n^{th}$ wavelength, and $k_n=R_{1n}/R_{2n}$ is the ratio at the $n^{th}$ wavelength, the transformation is simply:

$$R_n'=g(R_n)=k_n \cdot R_n \qquad (\text{EQN. 2})$$

If the first set of color standards and the second set of color standards are measured using the same color measurement instrument, and the transformation embodied in EQN. 2 is applied to the measured reflectance values for the second set of color standards, then the result of the transformation will be equal to the measured reflectance values for the first set of color standards. In other words, $R_2'=g(R_2)=k \cdot R_2=R_1$, where the multiplication is understood to operate element-by-element.

The above discussion of EQN. 2 assumes that the first set of color standards and the second set of color standards have been measured by the same color measurement instrument (i.e., a "first color measurement instrument"). However, when the second set of color standards is measured by a second color measurement instrument that is of the same kind (i.e., same manufacturer and model) as the first color measurement instrument, the same ratio $k_n$ obtained from the first color measurement instrument can also be used to transform the reflectance values measured by the second color measurement instrument. This will yield a set of "virtual" reflectance values that represent the values that the second color measurement instrument would have measured for the first set of color standards. Thus, even without actually measuring the first set of color standards using the second color measurement instrument, one can obtain the set of "virtual" reflectance values.

Figure 2:
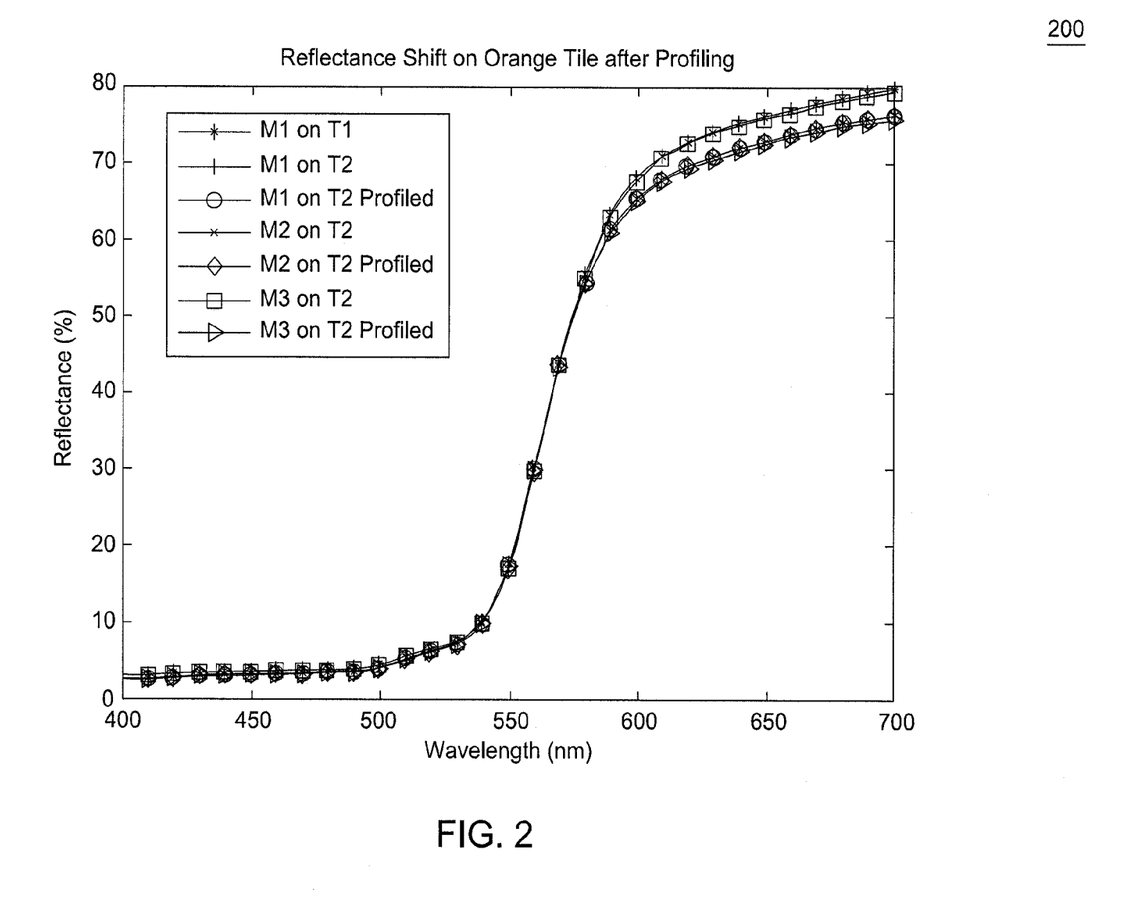
FIG. 2 is a graph illustrating the shift in measured reflectance values for an exemplary profiled tile from the second set of color standards as measured by three different color measurement instruments.

FIG. 2 is a graph illustrating the shift in measured reflectance values for an exemplary profiled tile ("T2") from the second set of color standards as measured by three different color measurement instruments. In particular, FIG. 2 plots the measurements taken by a first color measurement instrument ("M1"), a second color measurement instrument ("M2"), and a third color measurement instrument ("M3"). The second set of color standards was first profiled (i.e., mapped to a first set of color standards including a corresponding tile "T1") using the first color measurement instrument. As illustrated, after the second set of color standards has been profiled, all three of the color measurement instruments produce reflectance values for the second set of color standards that are substantially identical to the values that would have measured for the first set of color standards.

In one embodiment employing the above-described standard profiling technique, a set of color standards is chosen as a "master" set of color standards. One or more similar sets of color standards are chosen as "secondary" sets of color standards. The secondary sets of color standards are then profiled to the master set of color standards so that any measurements obtained using any secondary set of color standards can be correlated to the master set of color standards, resulting in "virtual" measurements as if the original measurements had been obtained using the master set of color standards. Moreover, a profiled secondary set of color standards can be used to correct a color measurement instrument to a "master" color measurement instrument. This process can be used both to perform an initial alignment of color measurement instruments (i.e., to adjust the values of the reflectances measured by one instrument so that they align with the values of the same reflectances measured by another instrument) and to confirm that an aligned color measurement instrument continues to perform properly (i.e., continues to behave like the instrument to which it has been aligned).

Figure 3:
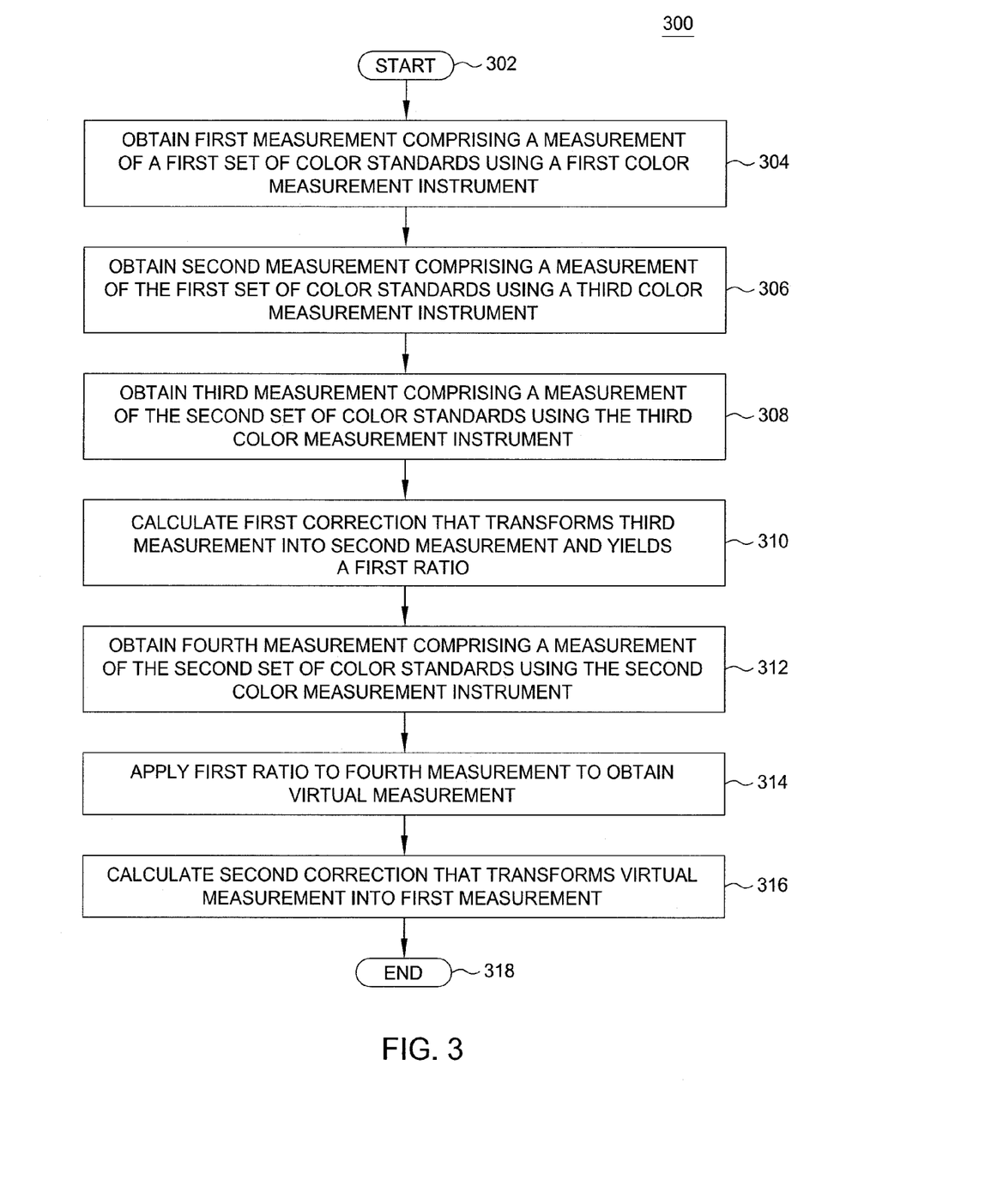
FIG. 3 is a flow diagram illustrating one embodiment of a method for aligning color measurements, according to the present invention.

FIG. 3 is a flow diagram illustrating one embodiment of a method 300 for aligning color measurements, according to the present invention. Thus, the method described in connection with FIG. 3 may be used to perform an initial alignment of color measurement instruments (e.g., in a factory where the color measurement instruments are manufactured and/or calibrated, or in the field). For the purposes of illustration, the following discussion of the method 300 assumes the existence of a "first" or "virtual master" color measurement instrument (which may, in fact, be an actual instrument or a composite of measurements from various actual instruments serving as a "virtual" instrument), two different color measurement instruments of the same type (a "second color measurement instrument" and a "third color measurement instrument"), and two different but similar sets of color standards (a "first set of color standards" and a "second set of color standards"). The method 300 may be performed in part by a processor that receives measurements from the color measurement instruments, accesses stored measurements, and performs calculations relating to profiling the color standards and/or color measurement instruments.

The method 300 begins in step 302. In step 304, the processor obtains a first measurement. The first measurement is a reflectance value measured by the first color measurement instrument on the first set of color standards.

In step 306, the processor obtains a second measurement. The second measurement is a reflectance value measured by the third color measurement instrument on the first set of color standards.

In step 308, the processor obtains a third measurement. The third measurement is a reflectance value measured by the third color measurement instrument on the second set of color standards.

In step 310, the processor calculates a first correction. The first correction transforms the third measurement into the second measurement. In one embodiment, the first correction yields a first ratio, k, of the second measurement to the third measurement.

In step 312, the processor obtains a fourth measurement. The fourth measurement is a reflectance value measured by the second color measurement instrument on the second set of color standards.

In step 314, the processor applies the first ratio to the fourth measurement to obtain a "fifth" or virtual measurement. The virtual measurement represents the reflectance value that the second color measurement device would have measured on the first set of color standards (i.e., without actually requiring that the second color measurement instrument measure the first set of color standards).

In step 316, the processor calculates a second correction. The second correction transforms the virtual measurement into the first measurement. Using the second correction, reflectance measurements made by the second color measurement instrument can now be aligned with measurements made by the first color measurement instrument.

The method 300 ends in step 318.

The third color measurement instrument need not be aligned to the first color measurement instrument prior to performing the method 300. In fact, it is preferable in some embodiments that the third color measurement instrument is not aligned to the first color measurement instrument prior to performing the method 300 (i.e., the second and third measurements made by the third color measurement instrument are not adjusted).

Figure 4:
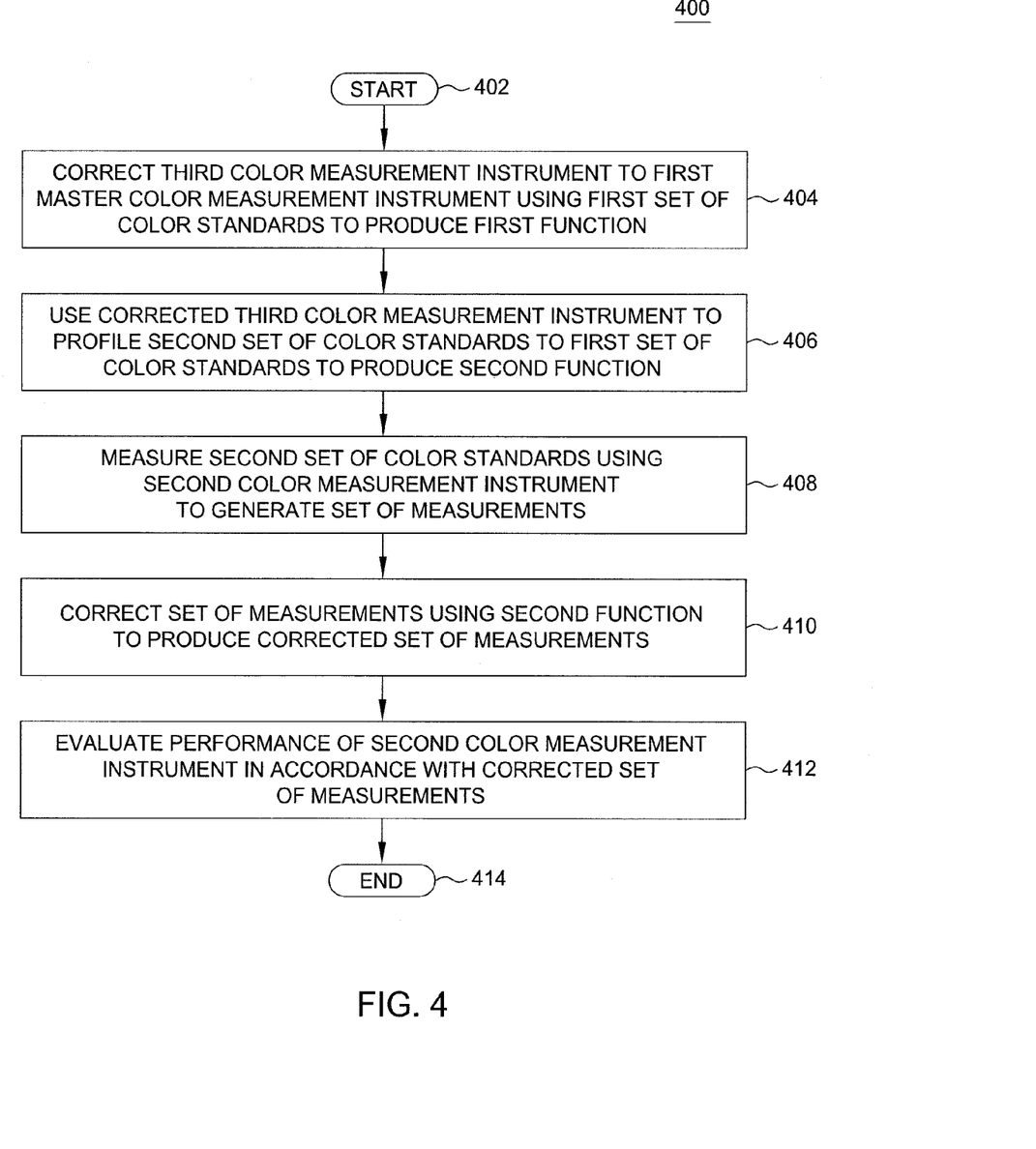
FIG. 4 is a flow diagram illustrating one embodiment of a method 400 for validating color measurements, according to the present invention.

FIG. 4 is a flow diagram illustrating one embodiment of a method 400 for validating color measurements, according to the present invention. Thus, the method described in connection with FIG. 4 may be used to confirm that a color measurement instrument in the field continues to measure like a virtual master color instrument to which it has been aligned. For the purposes of illustration, the following discussion of the method 400 assumes the existence of the same ("first," "second," and "third") color measurement instruments and ("first" and "second") sets of color standards. The method 400 may be performed in part by a processor that receives measurements from the color measurement instruments, accesses stored measurements, and performs calculations relating to profiling the color standards and/or color measurement instruments.

The method 400 begins in step 402. In step 404, the third color measurement instrument is corrected to the first/master color measurement instrument using the first set of color standards. In one embodiment, this requires a first set of measurements of the first set of color standards using the first color measurement instrument and a second set of measurements of the first set of color standards using the third color measurement instrument. In one embodiment, correction of the third color measurement instrument to the first/virtual master color measurement instrument generates a first function f (with a form instantiated by EQN. 1) by solving:

$$f(R_{T1in}(M1),T1)=R_{T1}(M0) \tag{EQN. 3}$$

where M1 is the third color measurement instrument, M0 is the first/virtual master color measurement instrument, T1 is the first set of color standards, $R_{T1}$ is a reflectance target (e.g., a tile) in the first set of color standards, $R_{T1in}(M1)$ is a set of input reflectance values for the first set of color standards as measured by the third color measurement instrument, and $R_{T1}(M0)$ is a set of target reflectance values for the first set of color standards as measured by the first/virtual master color instrument. Using the first function f, the third color measurement instrument can now be used to measure any sample $R_{in}$ and produce a correlated measurement according to:

$$R_{out}(M1,T1)=f(R_{in}(M1),T1) \tag{EQN. 4}$$

where $R_{in}(M1)$ is an uncorrected reflectance value measured by the third color measurement instrument (i.e., an input reflectance value) and $R_{out}(M1, T1)$ is the corresponding corrected reflectance value, corrected using the first set of color standards to the first/virtual master color measurement instrument. Thus, generally, the function $f(R_{in}(M1), T1)$, conditioned on the third color measurement instrument, inputs an uncorrected reflectance value $R_{in}(M1)$ and outputs a corrected reflectance value $R_{out}(M1, T1)$.

In step 406, the corrected third color measurement instrument is used to profile the second set of color standards to the first set of color standards (i.e., so that the second set of color standards will measure like the first set of color standards). In one embodiment, this requires a third set of measurements of the second set of color standards using the third color measurement instrument. In one embodiment, this standard profiling is performed using a second function g, which is obtained by solving:

$$g(f(R_{T2in}(M1),T1),T2)=R_{T1out}(M1,T1) \tag{EQN. 5}$$

where $R_{T2in}(M1)$ is a set of input reflectance values for the second set of color standards as measured by the third color measurement instrument. Thus, generally, the second function g multiplies, at each wavelength of each target (e.g., tile) in the first set of color standards, the measured reflectance over the reflectance of the corresponding target in the second set of color standards. In one embodiment, the second function g is only used with the second set of color standards.

In step 408, the second (presumably aligned) color measurement instrument is used to measure the second set of color standards, thereby producing a fourth set of measurements. In step 410, the fourth set of measurements produced in step 408 is corrected using the second function g to produce a "fifth" corrected set of measurements. In particular, $R_{T2'}(M2, T2)=g(R_{T2in}(M2), T2)$, where $R_{T2'}(M2, T2)$ is the set of measurement values measured by the second color measurement instrument for the second set of color standards, corrected to the first set of color standards. Thus, the fifth set of measurements can be considered "virtual" measurements that indicate how the second color measurement instrument would have measured the first set of color standards.

In step 412, the quality of the second color measurement instrument's performance is evaluated. In particular, the fifth set of measurements is compared to the first set of measurements. If the fifth set of measurements is substantially equal to the first set of measurements (i.e., matches within a tolerance), then the second color measurement instrument is considered to be aligned with the first/virtual master color measurement instrument. In one embodiment, alignment of the second color measurement instrument with the first/virtual master color measurement instrument is described by a third function h:

$$h(R_{T2'}(M2,T2),T2)=R_{T1}(M0) \tag{EQN. 6}$$

Using the third function h, the second color measurement instrument can be used to measure any sample and produce a correlated set of measurement values $R_{out}(M2, T2)=h(R_{in}(M2), T2')$. Thus, in one embodiment, the third function h has the same functional form as the first function f, but uses different constants (e.g., $R_{out}=A+B\ R_{in}+C\ dR_{in}/d\lambda+D\ d^2R_{in}/d\lambda^2$). In other embodiments, however, the third function h may have a different functional form.

The method 400 ends in step 414.

In the above discussion of the method 400, the first and third functions (f and h, respectively) each have the same two arguments. The first argument is a reflectance or set of reference-standard reflectances. The second argument is a color standard set that was used to derive the function. As a simple example, $f(R_{in}(M1), T1)$, is the function, conditioned on the third color measurement instrument M1, that inputs an uncorrected reflectance value $R_{in}(M1)$ and outputs a corrected reflectance value $R_{out}(M1, T1)$ The second function g also has two arguments. The first argument is a set of reference-standard reflectances (e.g., T1). The second argument is the set of color standards that is being correlated to the reference-standard reflectances by the same color measurement instrument (e.g., T2). As a simple example, $g(R_{T2in}(M2), T2)$ is the function, conditioned on the second set of color standards T2, that transforms the second reference set $R_{T2in}(M2)$ measured by the second color measurement instrument M2 to values predicted for the first set of color standards T1 measured by the second color measurement instrument M2. Since the destination set of color standards is always the first set of color standards, this isn't explicitly specified in the second function g.

The description of the methods 300 and 400 assumes that any measurement value is taken only once on one color measurement instrument. However, in practice, a measurement value may be the average of multiple measurement values, some of which may be taken on different color measurement instruments. This may eliminate some measurement errors any make the resultant values more reliable.

In further embodiments, the color standard profiling technique described above is extended to profile a set of color standards to a set of color standards that is traceable to a standardizing laboratory (e.g., the National Research Council). By doing this, the color measurement values produced by any of the color instruments discussed above can be traced to measurements at the standardizing laboratory.

Both the method 300 and the method 400 require that measurements of the second set of color standards by a test color measurement instrument (e.g., second color measurement instrument) be converted into a "virtual" measurement of the first set of color standards by the test instrument. For instance, the conversion may be performed using a color standard profile. The virtual measurement of the first set of color standards is then compared to an actual measurement of the first set of color standards by a master color measurement instrument. However, in the field, one may wish to validate a measurement taken by a test color measurement instrument by comparing it directly to a reference (i.e., without performing a conversion to a virtual measurement).

Figure 5:
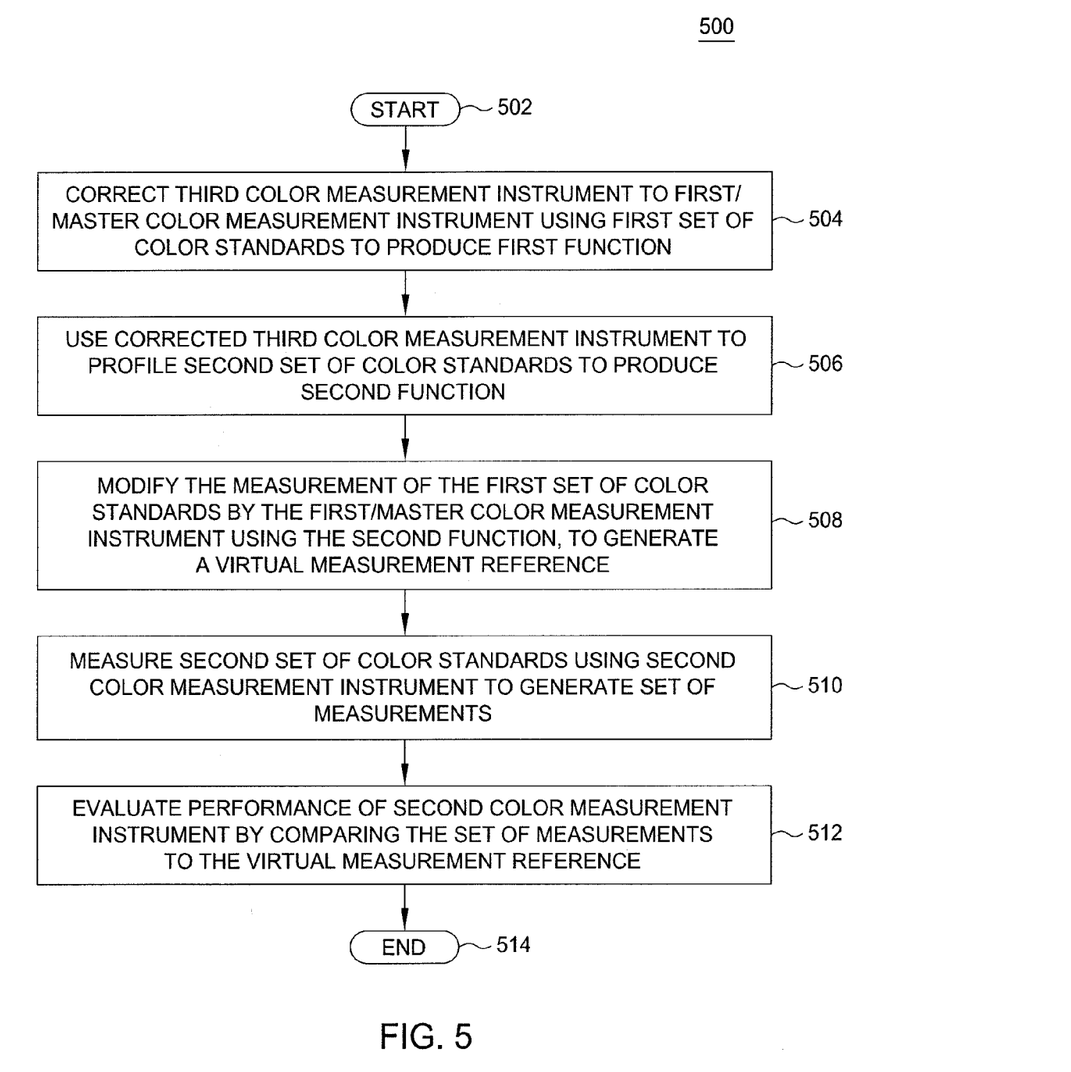
FIG. 5 is a flow diagram illustrating another embodiment of a method for validating color measurements, according to the present invention.

FIG. 5 is a flow diagram illustrating another embodiment of a method 500 for validating color measurements, according to the present invention. In particular, the method described in connection with FIG. 5 may be used to confirm that a color measurement instrument in the field continues to measure like a virtual measurement reference. For the purposes of illustration, the following discussion of the method 500 assumes the existence of the same ("first," "second," and "third") color measurement instruments and ("first" and "second") sets of color standards. The method 500 may be performed in part by a processor that receives measurements from the color measurement instruments, accesses stored measurements, and performs calculations relating to profiling the color standards and/or color measurement instruments.

The method 500 begins in step 502. In step 504, the third color measurement instrument is corrected to the first/master color measurement instrument using the first set of color standards. In one embodiment, this requires a first set of measurements of the first set of color standards using the first color measurement instrument and a second set of measurements of the first set of color standards using the third color measurement instrument. In one embodiment, correction of the third color measurement instrument to the first/virtual master color measurement instrument generates the first function f discussed above by solving EQN. 3. Using the first function f, the third color measurement instrument can now be used to measure any sample $R_{in}$ and produce a correlated measurement according to EQN. 4. Thus, generally, the function $f(R_{in}(M1), T1)$, conditioned on the third color measurement instrument, inputs an uncorrected reflectance value $R_{in}$ (M1) and outputs a corrected reflectance value $R_{out}(M1, T1)$.

In step 506, the corrected third color measurement instrument is used to profile the second set of color standards to the first set of color standards (i.e., so that the second set of color standards will measure like the first set of color standards). In one embodiment, this requires a third set of measurements of the second set of color standards using the third color measurement instrument. In one embodiment, this standard profiling is performed using a second function g, which is obtained by solving EQN. 5. Thus, generally, the second function g multiplies, at each wavelength of each target (e.g., tile) in the first set of color standards, the measured reflectance over the reflectance of the corresponding target in the second set of color standards. In one embodiment, the second function g is only used with the second set of color standards.

In step 508, the first set of measurements (i.e., of the first set of color standards by the first color measurement instrument) is modified using the second function g to produce a "fourth" set of measurements. In particular, $R_{T1'}(M1, T1)=g(R_{T1in}(M1), T1)$, where $R_{T1'}(M1, T1)$ is the set of measurement values measured by the first color measurement instrument for the first set of color standards, modified using the second function. Thus, the fourth set of measurements can be considered a "virtual" measurement reference.

In step 510, the second set of color standards is measured using the second color measurement instrument, to generate a fifth set of measurements. In step 512, the quality of the second color measurement instrument's performance is evaluated. In particular, the fifth set of measurements is compared to the fourth set of measurements. If the fifth set of measurements is substantially equal to the fourth set of measurements (i.e., matches within a tolerance), then the second color measurement instrument is considered to be aligned with the first/master color measurement instrument. In one embodiment, alignment of the second color measurement instrument with the first/virtual master color measurement instrument is described by the third function h, defined by EQN. 6.

The method 500 ends in step 514.

Figure 6:
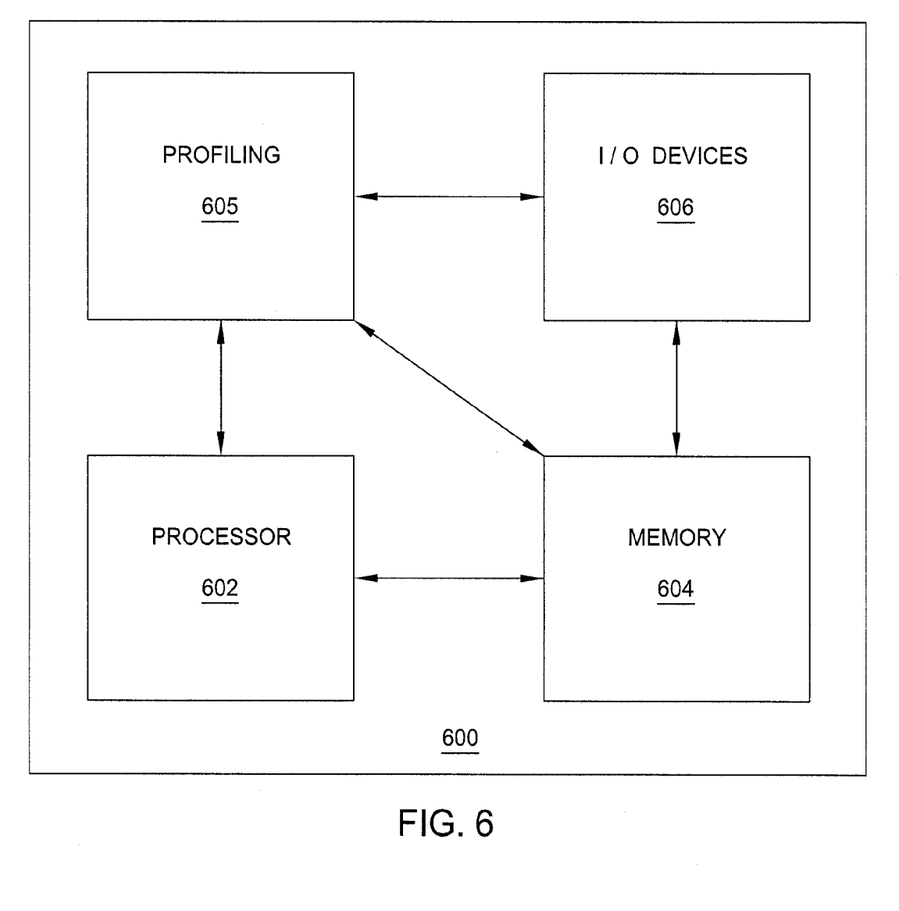
FIG. 6 is a high-level block diagram of the instrument profiling method that is implemented using a general purpose computing device.

FIG. 6 is a high-level block diagram of the instrument profiling method that is implemented using a general purpose computing device 600. In one embodiment, a general purpose computing device 600 comprises a processor 602, a memory 604, a profiling module 605 and various input/output (I/O) devices 606 such as a display, a keyboard, a mouse, a stylus, a wireless network access card, an Ethernet interface, and the like. In one embodiment, at least one I/O device is a storage device (e.g., a disk drive, an optical disk drive, a floppy disk drive). It should be understood that the profiling module 505 can be implemented as a physical device or subsystem that is coupled to a processor through a communication channel.

Alternatively, the profiling module 605 can be represented by one or more software applications (or even a combination of software and hardware, e.g., using Application Specific Integrated Circuits (ASIC)), where the software is loaded from a storage medium (e.g., I/O devices 606) and operated by the processor 602 in the memory 604 of the general purpose computing device 600. Thus, in one embodiment, the profiling module 605 for aligning the measurements of a fleet of color measurement instruments to a master (or "industry standard") color measurement instrument outside of the fleet and/or validating the alignment, as described herein with reference to the preceding figures, can be stored on a tangible or physical computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method for aligning measurements taken by a second color measurement instrument with measurements taken by first color measurement instrument, wherein the first color measurement instrument has access to a first set of color standards but not a second set of color standards, and the second color measurement instrument has access to the second set of color standards but not to the first set of color standards, the method comprising:

using a third color measurement instrument to generate a standard profile that mathematically transforms a value measured on the second set of color standards to a value measured on the first set of color standards, wherein the third color measurement instrument has access to both the first set of color standards and the second set of color standards;

mathematically transforming measurements of the second set of color standards taken by the second color measurement instrument into a set of virtual measurements of the first set of color standards, using the standard profile; and aligning the measurements taken by the second color measurement instrument to the measurements taken by the first color measurement instrument, using the virtual measurements.

2. The method of claim 1, wherein the using the third color measurement instrument to generate the standard profile comprises:

obtaining a first set of color values measured by the third color measurement instrument on the first set of color standards;

obtaining a second set of color values measured by the third color measurement instrument on the second set of color standards;

generating a function that mathematically transforms the second set of color values into the first set of color values.

3. The method of claim 2, wherein the function comprises a ratio of the second set of color values to the first set of color values.

4. The method of claim 3, wherein the mathematically transforming the measurements of the second set of color standards taken by the second color measurement instrument into a set of virtual measurements of the first set of color standards, using the standard profile, comprises:

multiplying the measurements of the second set of color standards taken by the second color measurement instrument by the ratio, wherein a product of the multiplying comprises the set of virtual measurements.

5. The method of claim 1, wherein the first color measurement instrument and the second color measurement instrument are located in geographically separate locations.

6. The method of claim 1, wherein each of: the measurements taken by the first color measurement instrument and the measurements taken by the second color measurement instrument comprises a group of reflectance values at different wavelengths.

7. The method of claim 1, wherein the set of virtual measurements represents measurements that the second color measurement instrument would have measured on the first set of color standards.

8. The method of claim 1, wherein the first color measurement instrument, the second color measurement instrument, and the third color measurement instrument are all of a common type of color measurement instrument.

9. The method of claim 1, wherein the first set of color standards is traceable to a standardizing laboratory.

10. The method of claim 1, wherein the first color measurement instrument comprises a virtual instrument that is a composite of a plurality of measurements taken by a plurality of different color measurement instruments.

11. A method for validating that measurements taken by a second color measurement instrument are aligned with measurements taken by first color measurement instrument, wherein the first color measurement instrument has access to a first set of color standards but not a second set of color standards, and the second color measurement instrument has access to the second set of color standards but not to the first set of color standards, the method comprising:

aligning measurements taken by a third color measurement instrument with the measurements taken by the first color measurement instrument, using the first set of color standards, wherein the third color measurement instrument has access to both the first set of color standards and the second set of color standards;

using measurements of the second set of color standards taken by the third color measurement instrument to generate a standard profile that mathematically transforms a value measured on the second set of color standards to a value measured on the first set of color standards;

mathematically transforming measurements of the second set of color standards taken by the second color measurement instrument into a set of virtual measurements of the first set of color standards, using the standard profile; and comparing the virtual measurements to measurements of the first set of color standards taken by the first color measurement instrument.

12. The method of claim 11, wherein the aligning measurements taken by the third color measurement instrument with the measurements taken by the first color measurement instrument comprises:

obtaining a first set of color values measured by the first color measurement instrument on the first set of color standards;

obtaining a second set of color values measured by the third color measurement instrument on the first set of color standards;

generating a function that mathematically transforms the second set of color values into the first set of color values.

13. The method of claim 11, wherein the using measurements of the second set of color standards taken by the third color measurement instrument to generate the standard profile that mathematically transforms the value measured on the second set of color standards to the value measured on the first set of color standards is performed after the aligning the measurements taken by the third color measurement instrument with the measurements taken by the first color measurement instrument.

14. The method of claim 11, wherein the first color measurement instrument and the second color measurement instrument are located in geographically separate locations.

15. The method of claim 11, wherein the set of virtual measurements represents measurements that the second color measurement instrument would have measured on the first set of color standards.

16. The method of claim 11, wherein the standard profile comprises a ratio of the value measured on the second set of color standards to the value measured on the first set of color standards.

17. The method of claim 16, wherein the mathematically transforming measurements of the second set of color standards taken by the second color measurement instrument into a set of virtual measurements of the first set of color standards, using the standard profile comprises:

multiplying the measurements of the second set of color standards taken by the second color measurement instrument by the ratio, wherein a product of the multiplying comprises the set of virtual measurements.

18. The method of claim 11, wherein the first color measurement instrument, the second color measurement instrument, and the third color measurement instrument are all of a common type of color measurement instrument.

19. The method of claim 11, wherein the comparing comprises:

confirming that the virtual measurements match the measurements of the first set of color standards taken by the first color measurement instrument, within a tolerance.

20. The method of claim 11, wherein the second color measurement instrument has been aligned to the first color measurement instrument prior to the method of claim 11 being performed.

21. A method for validating that measurements taken by a second color measurement instrument are aligned with measurements taken by first color measurement instrument, wherein the first color measurement instrument has access to a first set of color standards but not a second set of color standards, and the second color measurement instrument has access to the second set of color standards but not to the first set of color standards, the method comprising:

aligning measurements taken by a third color measurement instrument with the measurements taken by the first color measurement instrument, using the first set of color standards, wherein the third color measurement instrument has access to both the first set of color standards and the second set of color standards;

using measurements of the second set of color standards taken by the third color measurement instrument to generate a standard profile that mathematically transforms a value measured on the second set of color standards to a value measured on the first set of color standards;

modifying the measurements taken by first color measurement instrument in accordance with the standard profile to produce a virtual measurement reference; and comparing the virtual measurement reference to measurements of the second set of color standards taken by the second color measurement instrument.

* * * * *